United States Patent
Liu

(12) 
(10) Patent No.: US 6,691,736 B2
(45) Date of Patent: Feb. 17, 2004

(54) WATERPROOF VALVE OF EXHAUSTING TUBE

(76) Inventor: Ching-Hsiang Liu, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/414,866

(22) Filed: Apr. 14, 2003

(65) Prior Publication Data

US 2003/0201013 A1 Oct. 30, 2003

(51) Int. Cl.⁷ .............................................. F16K 15/03
(52) U.S. Cl. .................................................. 137/527.8
(58) Field of Search ............................. 137/527.8, 527, 137/527.6

(56) References Cited

U.S. PATENT DOCUMENTS 2,048,088 A  *  7/1936  Wagner ................... 137/527.8
6,192,926 B1 *  2/2001  Bueno Lopez .......... 137/527.8
6,543,474 B2 *  4/2003  Fetterman, Jr. ......... 137/527.8

* cited by examiner

Primary Examiner—Kevin Lee

(57) ABSTRACT

A waterproof valve of an exhausting tube comprises a tube body, a check portion, a check piece and a ball. An upper end of the check portion has two assembling holes. A check piece having two tip points at two side of the distal end thereof and a distal end of the check piece has a round hole. In assembly, the check portion and ball are mounted in the tube body; the assembling holes of the check portion are coupled to the tip points of the check portion. The round hole at the distal end of the check piece is assembled with the ball for controlling the action of the check piece.

1 Claim, 3 Drawing Sheets

WATERPROOF VALVE OF EXHAUSTING TUBE

FIELD OF THE INVENTION

The present invention relates to waterproof valves, and particularly to waterproof valve of an exhausting tube.

BACKGROUND OF THE INVENTION

When a car drives through a flood area, if the water level is at the exhausting pipe. The driver can drive the car through water by setting at a lower gear, retaining the engine at a high rotation speed, and making the oil valve at a steady level so as to avoid water to flow into the exhausting pipe, but if the water level is deeper and deeper, the drive desires to drive the car backwards. It is often that the exhausting pipe submerges in water so that the car cannot move backwards. Thereby, there is a demand for a valve which can prevent the undesired condition from occurring, that is, by a closing a check piece to avoid water to submerge the exhausting tube so as to close the oil valve. Thus, the car can drive backwards.

SUMMARY OF THE INVENTION

Accordingly, the primary object of the present invention is to provide a waterproof valve of an exhausting tube which comprises a tube body, a check portion, a check piece and a ball. An upper end of the check portion has two assembling holes. A check piece having two tip points at two side of the distal end thereof and a distal end of the check piece has a round hole. In assembly, the check portion and ball are mounted in the tube body; the assembling holes of the check portion are coupled to the tip points of the check portion. The round hole at the distal end of the check piece is assembled with the ball for controlling the action of the check piece.

The various objects and advantages of the present invention will be more readily understood from the following detailed description when read in conjunction with the appended drawing.

DETAILED DESCRIPTION OF THE PREFERRED EMBODIMENTS

Figure 1:
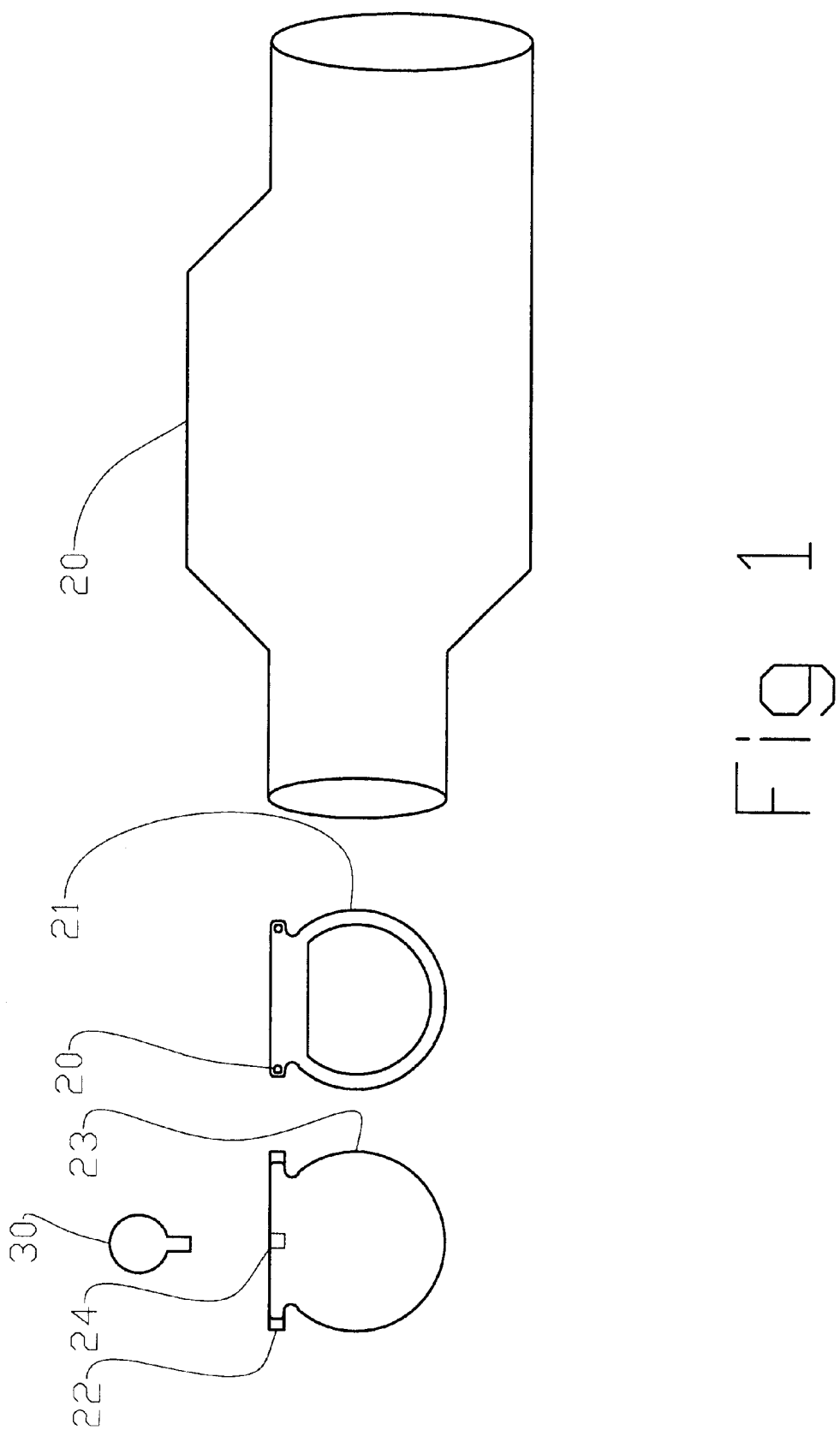
FIG. 1 is a perspective view of the present invention.

Referring to FIG. 1, the waterproof valve of an exhausting tube of the present invention includes a tube body 10, a check portion 20, a check piece 23 and a ball 30.

An upper end of the check portion 20 has assembling holes 21.

The check piece 23 has tip points at two side of the distal end thereof and a distal end of the check piece 23 has a round hole 24.

Figure 2:
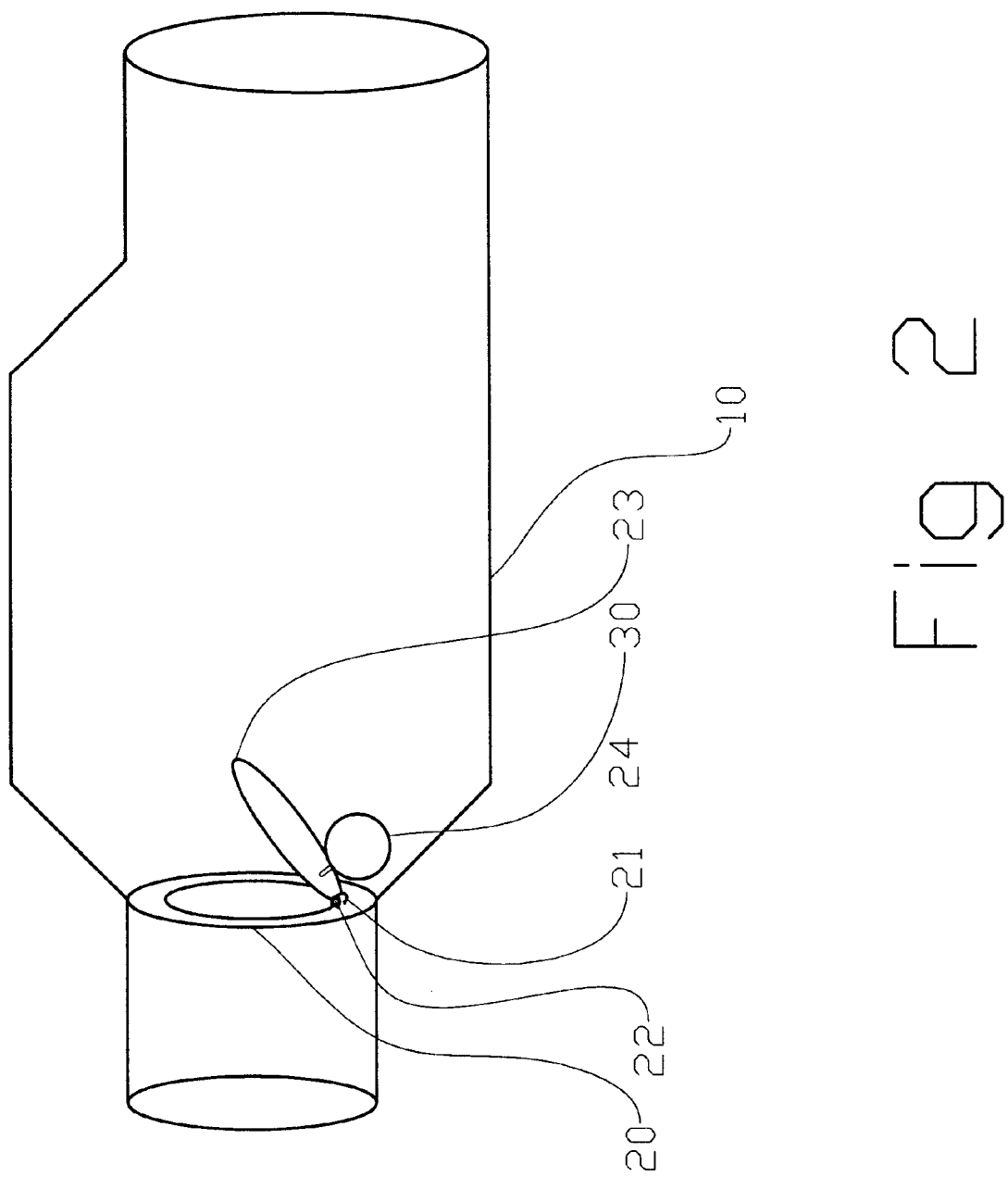
FIG. 2 is another perspective view of the present invention.
Figure 3:
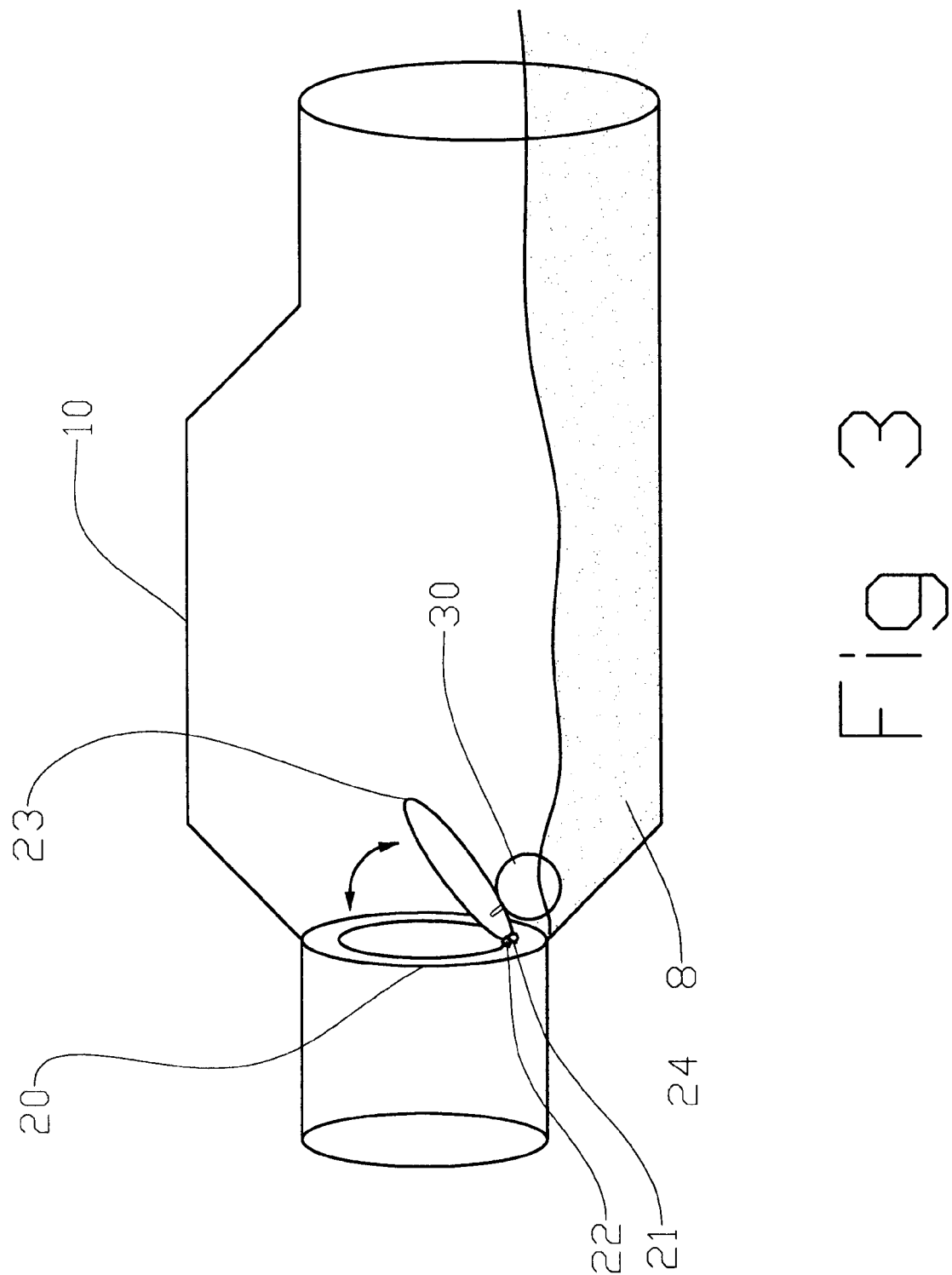
FIG. 3 is a schematic view of the present invention.

Referring to FIG. 2, in assembly, the check portion 20 and ball 30 are mounted in the tube body 10. The assembling holes 21 of the check portion 20 are coupled to the tip points 22 of the check portion 20. The round hole 214 at the distal end of the check piece 23 is assembled with the ball 30 for controlling the action of the check piece 23.

The operation of the present invention will be described here. In operation, water S flows into the tube body 10. The ball 30 can control the close of the check piece 23 for preventing water from flowing into the tube. When the water stops to flow into the tube or the pressure of the exhausting gas from a car is larger than water pressure, the check piece 23 is pushed away so as to control the open and close of the exhausting tube. Thereby, when flood has a level above the height of an exhausting tube, the present invention can be used to control avoid the car to have fault.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A waterproof valve of an exhausting tube comprising a tube body, a check portion, a check piece and a ball; wherein an upper end of the check portion has two assembling holes;

a check piece having two tip points at two sides of the distal end thereof and a distal end of the check piece has a round hole;

in assembly, the check portion and ball are mounted in the tube body; the assembling holes of the check portion are coupled to the tip points of the check portion; the round hole at the distal end of the check piece is assembled with the ball for controlling the action of the check piece.

* * * * *